US006923213B2

(12) United States Patent
Serafin et al.

(10) Patent No.: US 6,923,213 B2
(45) Date of Patent: Aug. 2, 2005

(54) FLUID PROCESSING DEVICE WITH ANNULAR FLOW PATHS

(75) Inventors: Mark Serafin, Apple Valley, MN (US); Neal K. Nelson, Stillwater, MN (US); Stanley R. Ellis, Mahtomedi, MN (US)

(73) Assignee: Imation Corp., Oakdale, MN (US)

( * ) Notice: Subject to any disclaimer, the term of this patent is extended or adjusted under 35 U.S.C. 154(b) by 298 days.

(21) Appl. No.: 10/246,511

(22) Filed: Sep. 18, 2002

(65) Prior Publication Data

US 2004/0050430 A1 Mar. 18, 2004

(51) Int. Cl.[7] .................................................. F16K 11/07
(52) U.S. Cl. ........................................ 137/896; 366/119
(58) Field of Search .................................. 137/605, 606, 137/896 I, 897; 366/119, 332

(56) References Cited

U.S. PATENT DOCUMENTS

| | | | | | |
|---|---|---|---|---|---|
| 3,052,288 | A | * | 9/1962 | Greco | 48/189.4 |
| 3,357,683 | A | * | 12/1967 | Helmer | 366/119 |
| 3,598,534 | A | | 8/1971 | Templer | |
| 3,833,718 | A | * | 9/1974 | Reed et al. | 366/162.4 |
| 4,533,254 | A | | 8/1985 | Cook et al. | |
| 4,709,728 | A | * | 12/1987 | Ying-Chung | 137/636.4 |
| 4,783,389 | A | | 11/1988 | Trout et al. | |
| 4,856,908 | A | * | 8/1989 | Hara et al. | 366/162.5 |
| 5,026,427 | A | | 6/1991 | Mitchell et al. | |
| 5,366,287 | A | * | 11/1994 | Verstallen | 366/162.4 |
| 5,852,076 | A | | 12/1998 | Serafin et al. | |
| 5,927,852 | A | | 7/1999 | Serafin | |
| 6,051,630 | A | | 4/2000 | Serafin et al. | |
| 6,398,404 | B1 | | 6/2002 | Karasawa | |

OTHER PUBLICATIONS

Clay et al., "Degradation of Monodisperse Polystyrene in a Fast Transient Extensional Flow," 56th Annual Technical Conference—Society of Plastic Engineers, vol. 1, pp. 977–980 (1998).

Higashitani et al., "Two–Dimensional Simulation of the Breakup Process of Aggregates in Shear and Elongational Flows," Journal of Colloid and Interface Science, vol. 204, No. 2, pp. 320–327 (1998).

Higashitani et al., "Simulation of deformation and breakup of large aggregates in flows of viscous fluids," Chemical Engineering Science, vol. 56, No. 9, pp. 2927–2938 (2001).

Krieger et al., "High–Shear Axial Flow in a Narrow Annulus," 63th Annual Meeting of the Society of Rheology, Rochester, NY, Oct. 20–24, 1991.

Krieger et al., "Centering Errors in Annular Flow," Theoretical and Applied Rheology, Proceedings of XIth International Congress on Rheology, Brussels, Belgium, pp. 929–931, Aug. 17–21, 1992.

Nguyen et al., "Influience of Nozzel Geometry on Polystyrene Degradation in Covergent Flow," Colloid & Polymer Science, vol. 269, No. 11, pp. 1099–1110 (1991).

Nguyen et al., "Chain Scission in Transient Extensional Flow Kinetics and Molecular Weight Dependence," Journal of Non–Newtonian Fluid Mechanics, vol. 30, pp. 125–140 (1998).

Rheometrics, Inc., RFX Owner's Manual (Preliminary Release) Chapter 5—Operating Guidelines, Dec., 1990.

* cited by examiner

*Primary Examiner*—Stephen M. Hepperle
(74) *Attorney, Agent, or Firm*—Eric D. Levinson

(57) ABSTRACT

The invention is directed to a high pressure fluid processing device for shearing particles in a fluid mixture. The fluid processing device makes use of annular flow paths. For example, a fluid mixture can be separated into two flow paths which are introduced to first and second annular flow paths on opposite sides of a flow path cylinder. The two annular flow paths flow toward one another through the cylinder, and meet one another within the cylinder. An outlet extends through the cylinder where the two annular flow paths collide allowing the fluid mixture flowing down the annular flow paths to be expelled through the gap.

10 Claims, 5 Drawing Sheets

FLUID PROCESSING DEVICE WITH ANNULAR FLOW PATHS

TECHNICAL FIELD

The invention relates to fluid processing and, more particularly, high pressure fluid processing devices for creating particulate structures in a fluid mixture.

BACKGROUND

The creation and processing of hard, non-compliant particles in a fluid mixture is desirable for a variety of industrial processes including, for example, the preparation of inks, paints, abrasive coatings, and the like. In addition, fluid mixtures of hard particles are used extensively in the coating of magnetic media, such as magnetic disks, magnetic tape or other magnetic media used for data storage. For magnetic media, the mixture may contain magnetic particles and a polymeric binder carried in a solvent. The coating process involves application of the mixture to a substrate, followed by a drying process to remove the solvent.

For high-density magnetic media and other industrial processes, the size and uniformity of the various particles is extremely important. To produce particles in a desired size range, industrial fluid processing techniques make use of one or more fluid processing devices. A fluid processing device processes the fluid mixture in a manner that subjects particles or other units of microstructure in the mixture to intense energy dissipation through the generation of a combination of intense shear and extensional forces. In this manner, agglomerations of the particles in the fluid mixture can be broken down into smaller sized particles.

SUMMARY

In general, the invention is directed to a high pressure fluid processing device for shearing particles or other units of microstructure in a fluid mixture. The fluid processing device makes use of annular fluid flow paths. For example, the fluid mixture can be separated into two fluid paths which are introduced to first and second annular flow paths on opposite sides of a flow path cylinder. The two annular flow paths flow toward one another through the cylinder, and meet one another within the cylinder. An outlet extends through the cylinder where the two annular flow paths collide, allowing a fluid mixture flowing down the annular flow paths to be expelled. The shear force of the collision of the mixture flowing down one annular flow path with the mixture flowing down the other annular flow path causes particles in the mixture to be broken into smaller particles prior to expulsion through the outlet.

A cylindrical rod may be positioned within the flow path cylinder to define the inner diameter of the annular flow paths. In other words, an inner diameter of the flow path cylinder defines an outer diameter of the annular flow paths, and an outer diameter of the cylindrical rod positioned inside the flow path cylinder defines an inner diameter of the annular flow paths.

In some embodiments, the cylindrical rod may be free to move and vibrate within the flow path cylinder, which can provide an automatic anti-clog mechanism. In other words, if particles in the mixture become clogged inside the fluid processing device, the cylindrical rod which defines the inner diameter of the annular flow path can move or vibrate as a result of pressure imbalance caused by the clog. The movement of the cylindrical rod, in turn, may help to clear the clogged material and restore the pressure balance within the fluid processing device.

The outlet can be located approximately near the center of the flow path cylinder, and may have a fixed or adjustable width. In the case where the width of the outlet is adjustable, the outer diameter of the annular flow paths may be defined by the inner diameter of two cylinders positioned in series, with the outlet being defined as the lateral gap between the two cylinders. In that case, the cylindrical rod extends inside each of the two cylinders to define the inner diameter of the annular flow paths. The outlet may be adjusted by moving one or both of the cylinders laterally relative to the other.

In one embodiment, the invention provides a fluid processing device comprising a first annular flow path, a second annular flow path, and an outlet for a fluid mixture flowing within both the first and second annular flow paths.

In another embodiment, the invention provides a fluid processing device comprising a first flow path, a second flow path, and an adjustable size outlet for a fluid mixture flowing within both the first and second flow paths.

In another embodiment, the invention provides a fluid processing device comprising a flow path cylinder that defines an outer diameter of first and second annular flow paths, and a rod positioned within the flow path cylinder that defines an inner diameter of the first and second annular flow paths. In addition, an outlet for a fluid mixture flowing within the first and second annular flow paths can be formed in the flow path cylinder.

In another embodiment, the invention provides a fluid processing device comprising a first flow path cylinder that defines an outer diameter of a first annular flow path, and a second flow path cylinder that defines an outer diameter of a second annular flow path. An outlet gap can be defined by a lateral distance between the first and second flow path cylinders. A rod can be positioned within the first and second flow path cylinders to define an inner diameter of the first and second annular flow paths.

In another embodiment, the invention provides a fluid processing system comprising a mixer that mixes particles into a fluid, a pump that pumps the mixed fluid along a flow path, and a fluid processing device that receives the mixed fluid. The fluid processing device may include first and second cylindrical flow paths that receive the mixed fluid and an outlet for the mixed fluid.

In another embodiment, the invention provides a method comprising mixing a fluid mixture, and pumping the fluid mixture into two opposing annular flow paths of a fluid processing device to cause shearing of particles in the mixture.

The invention may be capable of providing a number of advantages. In general, the invention may improve industrial manufacturing of coatings, inks, paints, and the like. In particular, the use of annular flow paths may improve the shearing of particles in a mixture, producing particles with reduced size and possibly enhanced size uniformity. In particular, annular flow paths may enhance wall shear forces in the fluid processing device, e.g., because of increased wall surface area for a given flow path. The invention may be capable of handling input pressures on the order of approximately 60,000 psi (413 MPa). In addition, the invention may provide automatic anti-clog features that can improve the industrial manufacturing process by reducing or avoiding the need to manually clean and de-clog the fluid processing device. Thus, the automatic anti-clog features can reduce maintenance costs and avoid down-time of the manufacturing system. Also, the invention may improve the end product in terms of reduced particle sizes and improve particle size uniformity.

Additional details of one or more embodiments are set forth in the accompanying drawings and the description below. Other features, objects, and advantages of the invention will be apparent from the description and drawings, and from the claims.

DETAILED DESCRIPTION

Figure 1:
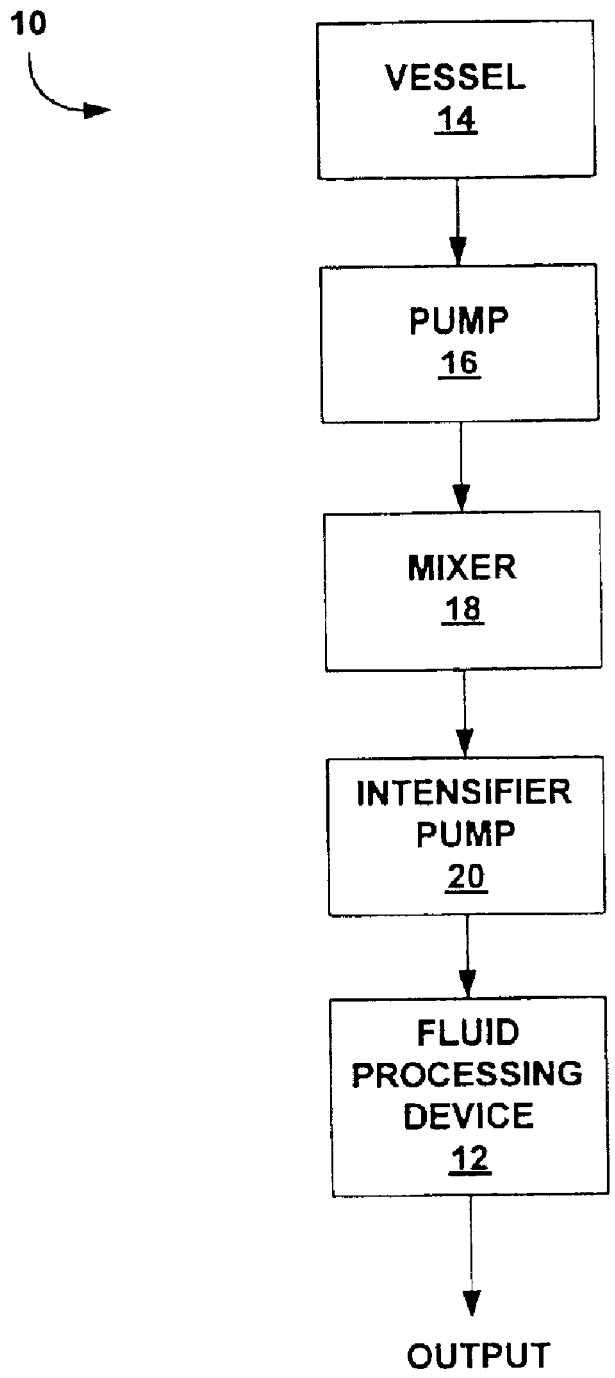
FIG. 1 is a block diagram of an industrial fluid processing system incorporating a fluid processing device in accordance with the invention.

FIG. 1 is a block diagram of an exemplary industrial fluid processing system 10. System 10 may incorporate a fluid processing device 12 with opposing annular flow paths, as further described herein. System 10, with fluid processing device 12, may be particularly useful in processing coating solutions having high concentrations of solids. For example, system 10 may be used to process coating solutions having solid particle contents of greater than approximately ten percent by weight, although the invention is not limited in that respect. For some industrial applications, the coating solution may carry hard, substantially non-compliant particles, such as magnetic pigments used for coating of magnetic media. System 10 may also be used for other industrial processes including, for example, the preparation of inks, paints, abrasive coatings, and the like.

As shown in FIG. 1, a vessel 14 stores one or more solvents, one or more collections of particles, and optionally other materials used to form a fluid mixture such as a coating solution, ink, paint, or the like. One or more pumps 16 can serve to draw the materials and solvent from vessel 14 and deliver the materials and solvent to mixer 18. Mixer 18 receives the materials and solvent pumped from vessel 14 and mixes the materials in the solvent. For example, mixer 16 may comprise a planetary mixer, a double planetary mixer, or the like. Additional materials may also be added in stages. Accordingly, vessel 14 may or may not contain all of the ingredients of a final mixture. Moreover, in some embodiments the fluid mixture may include two or more mixed fluids, with or without other particles mixed in the fluids.

One or more intensifier pumps 20, for example, may be capable of generating approximately 100 to 60,000 psi (690 kPa to 413 MPa) of fluid pressure. Fluid processing device 12, as described herein, may be capable of handling pressures greater than approximately 10,000 psi (68,950 kPa), greater than approximately 30,000 psi (207 MPa), greater than approximately 50,000 psi (345 MPa) or greater than approximately 60,000 psi (413 MPa). Following pressurization by intensifier pumps 20, the mixture is delivered to fluid processing device 12. Fluid processing device 12 causes shearing to reduce the size of the particles in the mixture. In other words, fluid processing device 12 serves to break down the particles in the mixture into smaller-sized particles, and thereby produce a finely dispersed solution of particles having a desired size range. Heat exchangers (not shown)

may be used to dissipate excess thermal energy generated in the mixture during processing and shearing.

A filtration element may be used to filter particles in the mixture. For example, the filtration element may comprise one or more porous membranes, mesh screens, or the like, to filter the mixture. The output of filtration element may then be used for magnetic coating (in the case of magnetic media manufacture), or other industrial processes. In some cases, the output may be packaged and sold, e.g., in the case of inks, paints, dyes or the like. A back pressure regulator (not shown) may be added downstream of filtration element to help maintain constant pressure in system 10 and provide a return path to supply vessel 14 for the mixture.

As described in greater detail below, fluid processing device 12 makes use of opposing, annular fluid flow paths. In particular, fluid processing device 12 may include a flow path cylinder and a rod positioned inside the flow path cylinder. Annular flow paths are defined by the outer diameter of the rod and the inner diameter of the flow path cylinder. Specifically, two annular flow paths flow toward one another through the cylinder, and meet within the cylinder, such as near the center of the cylinder. The opposing forces created by the fluid transmitted along the annular flow paths creates shear forces. An outlet extends through the cylinder where fluid mixtures flowing down the two annular flow paths collide, allowing the mixture to be expelled through the outlet. The shear force of the collision of the fluid mixtures causes particles in the mixture to be broken-up prior to expulsion through the gap, producing particles of reduced size. Moreover, annular flow paths may enhance wall shear forces in fluid processing device 12 by increasing surface area associated with a given flow path.

Figure 2:
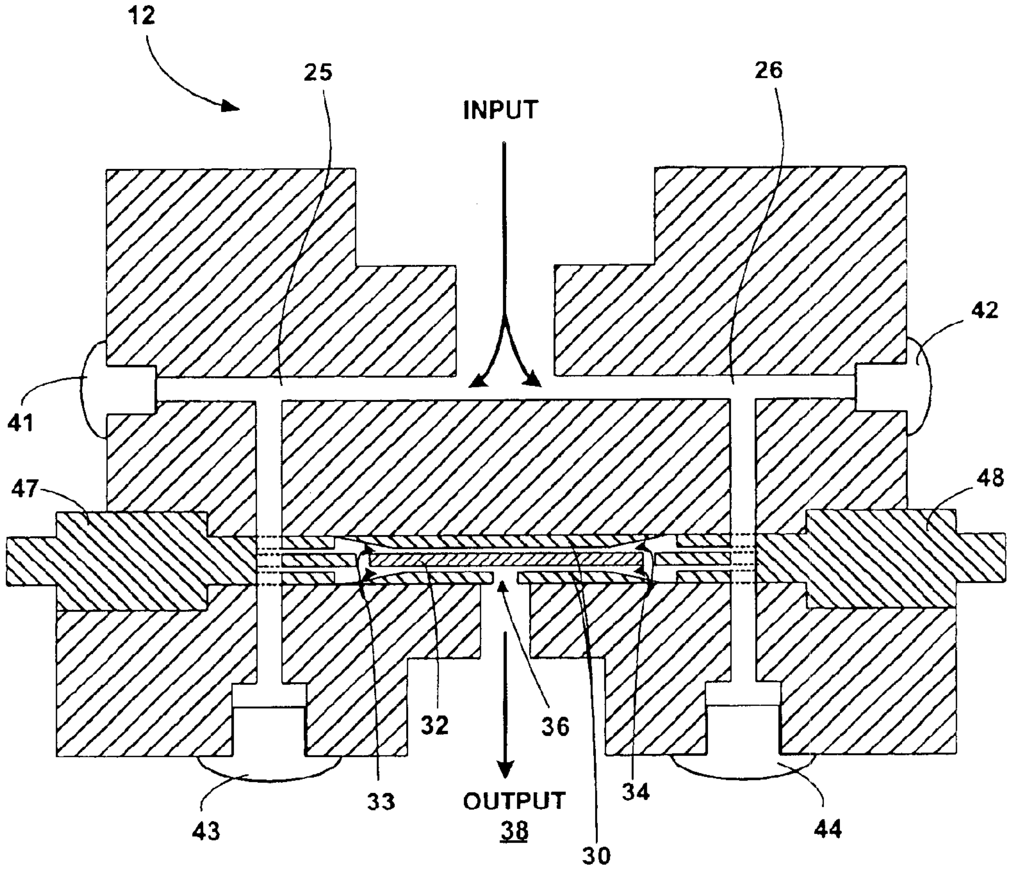
FIG. 2 is a cross-sectional side view of an exemplary fluid processing device.

The rod may be cylindrical, and can be positioned within the flow path cylinder to define the inner diameter of the annular flow paths. In other words, an inner diameter of the flow path cylinder defines an outer diameter of the annular flow paths, and an outer diameter of the cylindrical rod positioned inside the flow path cylinder defines an inner diameter of the annular flow paths. In some embodiments, the cylindrical rod may be free to move and vibrate within the flow path cylinder, which can provide an automatic anti-clog mechanism. Also, the outlet may be an adjustable gap defined by two separate flow path cylinders positioned in series, with the rod extending into both cylinders. In that case, the mixture flows down the cylinders in opposing directions and meets at the adjustable gap defined by separation of the two separate flow path cylinders FIG. 2 is a cross-sectional view of an exemplary fluid processing device 12 suitable for use in system 10 as described above. Fluid processing device 12 may be capable of handling pressures up to or greater than approximately 60,000 psi (413 MPa). A fluid mixture comprising a solvent and one or more different types of hard particles mixed in the solvent can be introduced to device 12 at input 24. Alternatively the mixture may include two or more solvents with or without additional particles mixed therein In any case, the mixture is separated into two separate initial flow paths 25, 26. Flow paths 25 and 26 feed into opposing sides of flow path cylinder 30, which defines annular flow paths.

In particular, the inner diameter of flow path cylinder 30 defines an outer diameter of annular flow paths that feed toward one another to meet at the center of cylinder 30. Rod 32 is positioned inside flow path cylinder 30. For example, rod 32 may define first and second ends. A first end of rod 32 extends into annular flow path 33 and a second end of rod 32 extends into second annular flow path 34. The outer diameter of rod 32 defines the inner diameter of the annular flow paths. Accordingly, flow paths 25 and 26 respectively feed into annular flow paths 33, 34 defined by flow path cylinder 30 and rod 32.

The mixture flows down annular flow paths 33, 34 and collides at or near outlet 36 formed in flow path cylinder 30, e.g., approximately at the lateral center of cylinder 30. The shear force of the collision of the mixture flowing down the annular flow paths 33, 34 causes agglomerations in the mixture to be broken up into smaller sized particles. Moreover, annular flow paths 33, 34 may enhance wall shear forces in fluid processing device 12 by increasing surface area associated with the flow paths. In this manner, fluid processing device 12 can be used to shear particles in a mixture. After shearing, the mixture is expelled through outlet 36 and exits fluid processing device 12 (as indicated at output 38).

As further shown in FIG. 2, fluid processing device 12 may include pressure sensors 41, 42 to measure pressure within fluid processing device 12, as well as temperature sensors 43, 44 to measure the input temperature of the mixture. A controller (not shown) may receive the pressure and temperature measurements, and adjust the pressure via one or more regulator valves (not shown) to maintain a desired pressure within fluid processing device 12. Similarly, the controller may receive temperature measurements, and cause adjustment of the temperature of the mixture, as needed, to maintain a desired input temperature for the mixture into fluid processing device 12. In particular, it is generally desirable to maintain substantially identical mixture flows down the respective annular flow paths 33, 34 to ensure a desired impingement energy of shearing.

Substantially identical flows of the mixtures down the respective annular flow paths 33, 34, e.g., in terms of pressure or temperature, is indicative of a non-clogged condition. Temperature monitoring, in particular, can be used to identify when a clogged condition occurs, and may be used to identify when an anti-clogging measures should be taken, e.g., application of a pulsated short term pressure increase in the input flow to clear the clog.

Gland nuts 47, 48 may be used to secure flow path cylinder 30 in the proper location within fluid processing device 12. Moreover, gland nuts 47, 48 can be formed with channels (indicated by the dotted lines) that allow fluid to flow freely through flow paths 25, 26 and into annular flow paths 33, 34.

Rod 32 may be cylindrically shaped, although the invention is not necessarily limited in that respect. For example, other shapes of rod 32 may further enhance wall shear forces in the annular flow paths. Rod 32 may be free to move and vibrate within the flow path cylinder 30. In particular, rod 32 may be unsupported within flow path cylinder 30. Free movement of rod 32 relative to flow path cylinder 30 can provide an automatic anti-clogging mechanism to fluid processing device 12. If particles or agglomerations in the mixture become clogged inside the fluid processing device 12, e.g., at the edges of annular flow paths 33, 34, rod 32 may respond to local pressure imbalances by moving or vibrating. In other words, a clog within cylinder 30 or in proximity of annular flow paths 33, 34 may result in a local pressure imbalance that causes rod 32 to move or vibrate. The movement and/or vibration of the rod 32, in turn, may help to clear the clog and return the pressure balance within fluid processing device 12. In this manner, allowing rod 32 to be free to move and vibrate within the flow path cylinder 30 can facilitate automatic clog removal.

To further improve clog removal, a pulsated short term pressure increase in the input flow can be performed upon identifying a clog. For example, as mentioned above, temperature sensors 41, 42 may identify temperature changes in flow paths 25, 26 occur, which may be indicative of a clogged condition. In response, a short term pressure increase, e.g., a two-fold pressure increase for approximately five seconds, can cause more substantial movement and/or vibration of the rod 32 to facilitate clog removal. The pulsated short term pressure increase in the input flow can be performed in response to identifying a clogged condition, or on a periodic basis. For example, intensifier pump 20 (FIG. 1) can be used to adjust the input pressure to fluid processing device 12. A short term pressure increase may be particularly useful in clearing clogs that affect both annular flow paths 33, 34. In that case, the temperature of both input flow paths may be similar, but may increase because of the clog that affects both annular flow paths 33, 34.

In different embodiments, outlet 36 can have a fixed or adjustable size. For example, outlet 36 may take the form of a gap with an adjustable width. Flow path cylinder 30 and rod 32 may define substantially constant diameters, or one or both of flow path cylinder 30 and rod 32 may define diameters that vary or change along the annular flow paths. The components of fluid processing device 12, including flow path cylinder 30 and rod 32 may be formed of a hard durable material such as steel or a carbide material. As one example, flow path cylinder 30 and rod 32 can be formed of tungsten carbide containing approximately six percent tungsten by weight.

Figure 3:
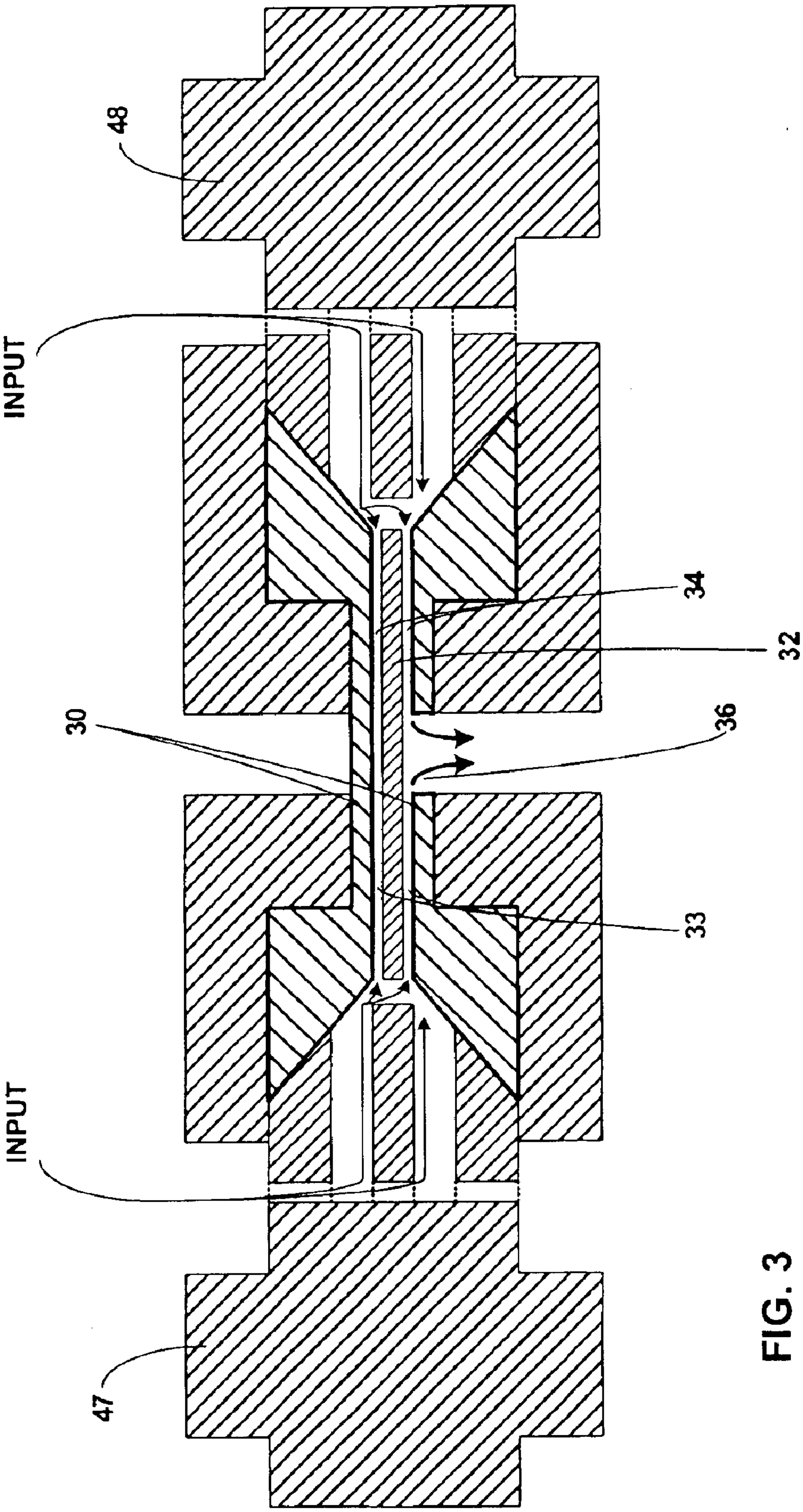
FIGS. 3 and 4 are cross-sectional side views of portions of a fluid processing device that incorporate annular flow paths in accordance with the invention.

FIG. 3 is a cross-sectional side view of a portion of a fluid processing device 12 that incorporates annular flow paths. Gland nuts 47, 48 may be used to secure flow path cylinder 30 in the proper location within fluid processing device 12. Moreover, gland nuts 47, 48 can be formed with channels (indicated by the dotted lines) that allow fluid to flow freely into annular flow paths 33, 34. The ends of flow path cylinder 30 may be formed to mate with gland nuts 47, 48 in order to facilitate securing of cylinder 30 in a precise location.

Again, annular flow paths 33, 34 are defined by flow path cylinder 30 and rod 32. Flow path cylinder 30 may define a minimum width that remains substantially constant along the annular flow paths. Rod 32 may be cylindrically shaped, and can be free to move and vibrate within the flow path cylinder 30. Ordinarily rod 32 is concentric with the annular flow paths, having a center axis that is aligned with the central longitudinal axis of flow path cylinder 30. Fluid dynamic forces and uniform balance of rod 32 can force rod 32 toward the lateral and longitudinal center of the annular flow path. Movement and vibration of rod 32 within the flow path cylinder 30 can facilitate automatic clog removal.

The minimum width of the inner diameter of flow path cylinder 30 may be in the range of approximately 0.1 inch (0.254 cm) to 0.001 inch (0.00254 cm). For example, the width of the inner diameter of flow path cylinder 30 may be approximately 0.0290 inch (0.07366 cm). The width of the outer diameter of rod 32 may be slightly smaller than the minimum inner diameter of flow path cylinder 30. For example, if the width of the inner diameter of flow path cylinder 30 is approximately 0.0290 inch (0.07366 cm), the width of the outer diameter of rod 32 may be between approximately 0.0260 inch (0.06604 cm) and 0.0280 inch (0.07112 cm). Other sizes, widths and shapes of flow path cylinder 30 and rod 32 could also be used in accordance with the invention.

By way of example, the width of outlet 36 may be approximately between 0.0001 inch (0.000254 cm) and 0.1 inch (0.254 cm). As one example, the width of outlet 36 at the outer diameter of flow path cylinder 30 is approximately between 0.006 inch (0.01524 cm) and 0.010 inch (0.0254 cm). Outlet 36 may extend approximately 180 degrees around cylinder 30, or may extend to a lesser or greater extent, if desired. Other sizes and shapes of outlet 36 could also be used.

Figure 4:
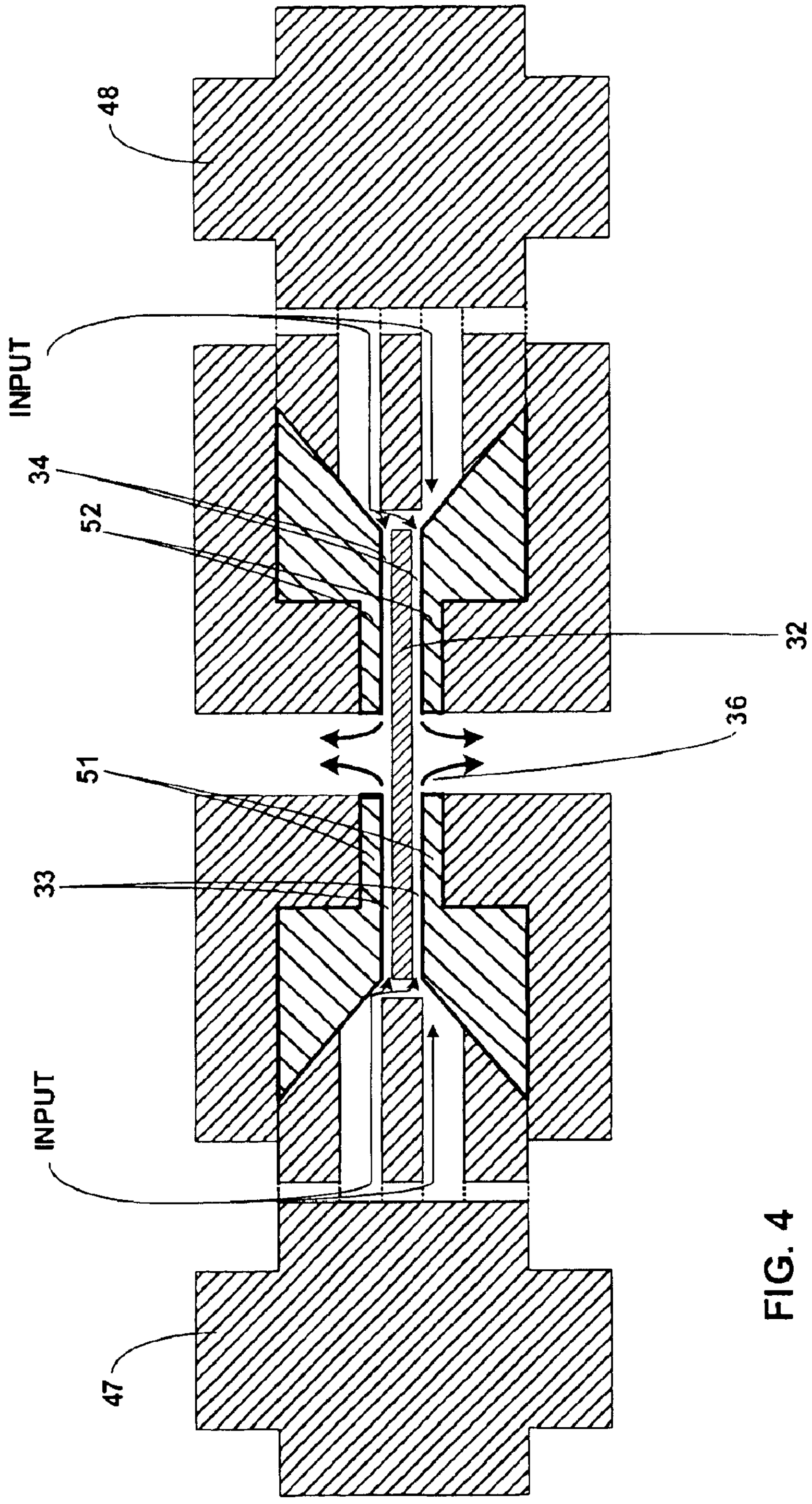

FIG. 4 is another cross-sectional side view of a portion of a fluid processing device 12 that incorporates annular flow paths. The configuration of FIG. 4 may be substantially similar to that of FIG. 3 in terms of the shapes and sizes of the features. In FIG. 4, however, two flow path cylinders 51 and 52 collectively perform the function of the single flow path cylinder 30 illustrated in FIG. 3.

In the configuration of FIG. 4, the width of outlet 36 is adjustable. The outer diameter of the annular flow paths 33, 34 may be defined by the inner diameter of two cylinders 51 and 52 positioned in series, with outlet 36 being defined as the lateral gap 36 between the two cylinders 51 and 52. In that case, rod 32 extends inside each of the two cylinders 51, 52 to define the inner diameter of the annular flow paths 33, 34. In other words, a first end of rod 32 defines an inner diameter of annular flow path 33 and a second end of rod 32 defines an inner diameter of annular flow path 34. The outlet 36 may be adjusted by moving one of the cylinders 51 or 52 laterally relative to the other of the cylinders 51 or 52. Gland nuts 47 and 48 may facilitate this gap adjustment. In particular, gland nuts 47 and 48 may include threading to facilitate transnational movement of gland nuts 47, 48 relative to one another to adjust the position of cylinders 51 and 52 relative to one another and thereby adjust the size of outlet 36.

In the configuration of FIG. 4, outlet 36 extends the entire 360 degrees about cylinders 51 and 52. If desired, a plug or other mechanism to block fluid flow may be added to limit fluid output in some directions.

Figure 5:
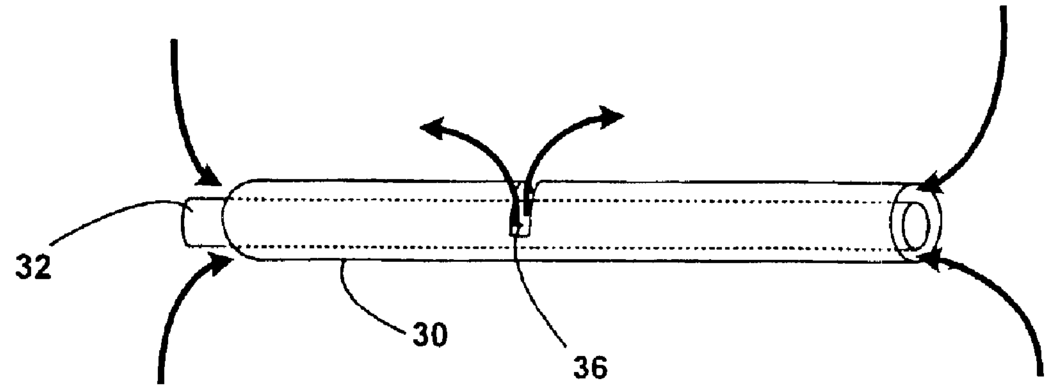
FIGS. 5 and 6 are conceptual perspective views of a cylindrical rod inside one or more flow path cylinders to define annular flow paths for fluid processing.
Figure 6:
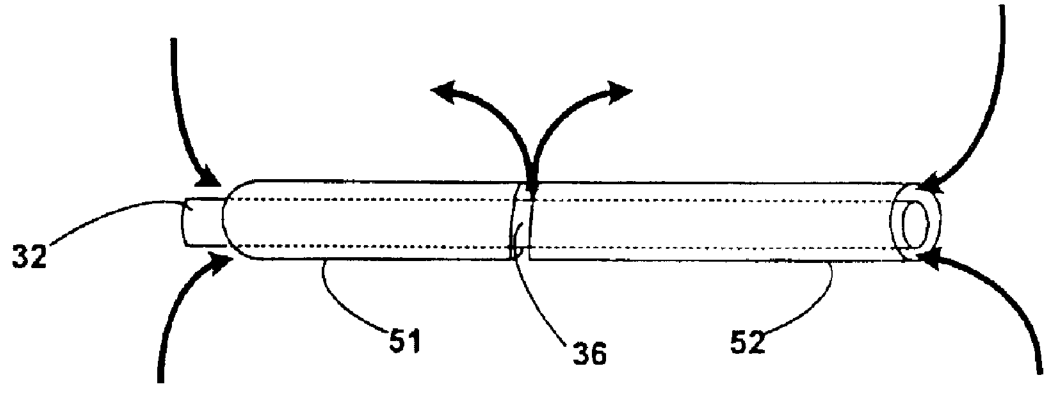

FIGS. 5 and 6 are conceptual perspective views of a cylindrical rod 32 inside one or more flow path cylinders to define annular flow paths for fluid processing. As shown in FIG. 5, a single flow path cylinder 30 can be formed with an outlet 36 that extends approximately 180 degrees around flow path cylinder 30, or to a lesser or greater extent, if desired. In any case, in the configuration of FIG. 5 outlet 36 has a fixed width. As indicated by the arrows, a fluid mixture can be introduced to flow path cylinder 30 on opposing sides of cylinder, and can flow down the cylinder. The mixture introduced on one side of cylinder 30 collides near outlet 36 with the mixture introduced on the other side of cylinder 30, causing shearing of particles in the mixture. Moreover, annular flow paths may enhance wall shear forces in cylinder 30 by increasing surface area associated with the opposing flow paths.

Rod 32 is positioned inside flow path cylinder 30, thereby creating flow paths that are annular. Rod 32 may have a length that is longer, shorter, or approximately the same length as flow path cylinder 30. Preferably, rod 32 may have a length that is longer than the length of flow path cylinder 30, but shorter than a distance between input nozzles (not shown) or gland nuts (not shown) through which fluid is introduced into flow path cylinder 30.

In an alternative embodiment shown in FIG. 6, two separate flow path cylinders 51, 52 are used instead of the single flow path cylinder 30. In that case, outlet 36 is formed by the lateral distance between the two flow path cylinders 51, 52. Accordingly, in that case, outlet 36 may be adjustable by moving one of flow path cylinders 51, 52 relative to the other of flow path cylinders 51, 52. In FIG. 6, outlet 36 extends the full 360 degrees of flow path cylinders 51, 52. If desired, part of this gap may be covered or blocked such that the fluid mixture can escape from flow path cylinders 51, 52 in limited directions.

A number of embodiments of the invention have been described. Nevertheless, it is understood that various modifications may be made without departing from the spirit and scope of the invention. For example, the fluid processing device may be used in other industrial systems that may or may not include the components illustrated in FIG. 1. Accordingly, other embodiments are within the scope of the following claims.

What is claimed is:

1. A fluid processing device comprising:

a first annular flow path;

a second annular flow path;

an outlet for a fluid mixture flowing within the first and second annular flow paths;

a flow path cylinder that defines an outer diameter of the first and second annular flow paths, the outlet being formed in the flow path cylinder; and a cylindrical rod positioned within the flow path cylinder that defines an inner diameter of the first and second annular flow paths, wherein the cylindrical rod is not attached to any structure within the fluid processing device and is free to move under fluid dynamic force relative to the flow path cylinder.

2. The fluid processing device of claim 1, wherein the outlet is adjustable by laterally moving one of the flow path cylinders relative to the other of the flow path cylinders.

3. The fluid processing device of claim 1, wherein the outer diameter of the first and second annular flow paths is between approximately 0.254 cm and 0.00254 cm, the inner diameter of the first and second annular flow paths is between approximately 0.0664 cm and 0.07112 cm, and a width of the outlet is between approximately between 0.000254 cm and 0.254 cm.

4. A fluid processing device comprising:

a first annular flow path;

a second annular flow path;

an adjustable size outlet for a fluid mixture flowing within the first and second flow paths; and a cylindrical rod positioned within the first and second flow path cylinders that defines an inner diameter of the first and second annular flow paths, wherein the cylindrical rod is not attached to any structure within the fluid processing device and is free to move under fluid dynamic force relative to the first and second flow path cylinders.

5. The fluid processing device of claim 4, further comprising:

a first flow path cylinder that defines an outer diameter of the first flow path;

a second flow path cylinder that defines an outer diameter of the second flow path, the adjustable size outlet being defined by a lateral distance between the first and second flow path cylinders, and being adjustable by laterally moving one of the flow path cylinders relative to the other of the flow path cylinders.

6. A fluid processing device comprising:

a first flow path cylinder that defines an outer diameter of a first annular flow path through the device;

a second flow path cylinder that defines an outer diameter of a second annular flow path through the device;

an outlet defined by a lateral distance between the first and second flow path cylinders; and a cylindrical rod positioned within the first and second flow path cylinders that defines an inner diameter of the first and second annular flow paths, wherein the cylindrical rod is not attached to any structure within the fluid processing device and is free to move under fluid dynamic force relative to the first and second flow path cylinders.

7. The fluid processing device of claim 6, the outlet being adjustable by laterally moving one of the flow path cylinders relative to the other of the flow path cylinders.

8. A fluid processing system comprising:

a mixer that mixes a fluid;

a pump that pumps the mixed fluid; and a fluid processing device that processes the mixed fluid, the fluid processing device including:

a first annular flow path;

a second annular flow path; and an outlet for a fluid mixture flowing within the first and second annular flow paths.

9. The fluid processing system of claim 8, the fluid processing device further including:

a flow path cylinder that defines an outer diameter of the first and second annular flow paths, the outlet being formed in the flow path cylinder; and a rod, positioned within the flow path cylinder, that defines an inner diameter of the first and second annular flow paths, wherein the rod is not attached to any structure within the fluid processing device and is free to move under fluid dynamic force relative to the flow path cylinder.

10. The fluid processing system of claim 8, the fluid processing device further including:

a first flow path cylinder that defines an outer diameter of the first annular flow path;

a second flow path cylinder then defines an outer diameter of the second annular flow path, the outlet being defined by a lateral distance between the first and second flow path cylinders; and a rod positioned within the first and second flow path cylinders that defines an inner diameter of the first and second annular flow paths, wherein the rod is not attached to any structure within the fluid processing device and is free to move under fluid dynamic force relative to the first and second flow path cylinders.

* * * * *